US010736383B2

(12) United States Patent
 Siprut

(10) Patent No.: US 10,736,383 B2
(45) Date of Patent: Aug. 11, 2020

(54) DEVICE AND TECHNIQUE FOR SECURING LACES

(71) Applicant: Leonard Albert Siprut, San Diego, CA (US)

(72) Inventor: Leonard Albert Siprut, San Diego, CA (US)

( * ) Notice: Subject to any disclaimer, the term of this patent is extended or adjusted under 35 U.S.C. 154(b) by 0 days.

(21) Appl. No.: 16/219,131

(22) Filed: Dec. 13, 2018

(65) Prior Publication Data

US 2019/0183211 A1 Jun. 20, 2019

Related U.S. Application Data

(60) Provisional application No. 62/607,314, filed on Dec. 18, 2017.

(51) Int. Cl.
| | |
|---|---|
| *A43C 7/00* | (2006.01) |
| *A41F 1/00* | (2006.01) |
| *A41F 9/02* | (2006.01) |
| *F16G 11/10* | (2006.01) |
| *F16G 11/12* | (2006.01) |
| *A43C 9/00* | (2006.01) |
| *A44B 11/04* | (2006.01) |

(52) U.S. Cl.
 CPC ............... *A43C 7/005* (2013.01); *A41F 1/00* (2013.01); *A41F 9/025* (2013.01); *A43C 7/00* (2013.01); *A43C 9/00* (2013.01); *F16G 11/10* (2013.01); *F16G 11/12* (2013.01); *A41D 2300/30* (2013.01); *A44B 11/04* (2013.01)

(58) Field of Classification Search
 CPC .... A43C 1/00; A43C 1/04; A43C 7/00; A43C 7/08; A41D 2300/30; A44B 11/04; B65D 63/14; Y10T 24/37; Y10T 24/3929; Y10T 24/1404
 See application file for complete search history.

(56) References Cited

U.S. PATENT DOCUMENTS

| | | | | |
|---|---|---|---|---|
| 1,142,199 | A * | 6/1915 | Olson | A43C 9/00 24/713 |
| 5,069,570 | A * | 12/1991 | Pryor | F16B 7/14 403/104 |
| 5,724,710 | A * | 3/1998 | Hancock | A43C 7/06 24/129 D |
| 6,588,078 | B2 | 7/2003 | Writt et al. | |
| 7,152,285 | B2 | 12/2006 | Liao | |
| 9,347,522 | B2 | 5/2016 | DeLuca | |
| 9,427,045 | B1 | 8/2016 | Hannon | |
| 2013/0185846 | A1 * | 7/2013 | Bauer | A41F 1/00 2/243.1 |

\* cited by examiner

*Primary Examiner* — Jack W Lavinder
(74) *Attorney, Agent, or Firm* — TJSL Patent Clinic

(57) ABSTRACT

A device for use in securing two or more laces on an article of clothing includes (a) a piece of flexible and elastic material having shear-resistive properties and an initial disk-like shape and (b) a hole formed in the material. When the laces are inserted through the hole a first time, wrapped together around a portion of the piece of material, inserted together through the hole a second time, and pulled tightly in opposite directions, the material deforms to (1) assume a self-herniated shape in which the material grips the laces and folds upon itself and the laces toward the hole, and (2) retain the self-herniated shape and secure the laces in place after pulling forces are removed from the laces.

10 Claims, 4 Drawing Sheets

DEVICE AND TECHNIQUE FOR SECURING LACES

CROSS-REFERENCE TO RELATED APPLICATION

This application claims priority from U.S. Provisional Patent Application No. 62/607,314, filed on Dec. 12, 2017, and titled "DEVICE AND TECHNIQUE FOR SECURING LACES."

FIELD OF DISCLOSURE

This application relates to a device and technique for securing laces, such as those commonly used to tightly secure articles of clothing to the human body.

BACKGROUND

In today's world, some articles of clothing are specifically designed for extreme physical activities that place great duress on hand-tied knots, such as board shorts for surfing and athletic shoes worn on the field or court of play. Extreme physical activities such as these often disengage the knots tied in laces, causing the articles of clothing to loosen on the wearer's body, often at very inopportune times.

Articles for use in assisting the tying or securing of laces, in addition to or in lieu of hand-tied knots, are not uncommon. Typically, these articles are bulky and uncomfortable to the wearer, are easily broken, or are ineffective altogether at holding laces securely in more stressful environments. For some laces and applications in which they're used, even just tying the laces in a knot without using a tying/securing device of any sort can make the laces bulky and uncomfortable to the wearer.

Many of the devices designed to hold laces in place or to knot the laces are made of hard, brittle plastics and have moving parts that are unreliable. One such device that is commonly available is the spring-loaded clasp, such as that shown in U.S. Pat. No. 7,152,285. Spring-loaded clasps are highly effective for some uses, but they are prone to breaking after repeated use or when used in more extreme physical activities. Also, even though they are very simple mechanical devices, spring-loaded clasps are relatively expensive to manufacture (compared to other much simpler devices) and are difficult to replace once broken, as they typically come pre-installed with the laces they are meant to secure and are not readily available as individual units to be used as replacement parts.

The notched disk of U.S. Pat. No. 9,347,522 is an example of a very simple, inexpensive lace-securing device that offers two different options (most useful when applied in combination) for securing laces, each option requiring manufacture from materials that are both rigid and compressible at the same time, such as the highly dense polyurethane foam or hard plastic materials described in the '522 patent. With this device, the user inserts the laces through a hole in the device and then secures them by inserting them into two slits formed along the edges of the device. Using a highly dense but slightly compressible material allows the laces to slide into the slits and then, for a time, be held in place by the compressing forces of the material. The other technique for using this device is simply to insert the laces through the hole and leave the laces hanging there, a technique that works only when the laces are of sufficient thickness to compress the material around the hole significantly. With both of these techniques, however, the device of the '522 patent is prone to losing its grip on the laces over time, especially when used in high-impact activities, such as surfing and highly active sports like basketball and distance running

SUMMARY

Described here is a device for use in securing two or more laces on an article of clothing. The device is comprised of a piece of flexible and elastic material having shear-resistive properties and an initial disk-like shape, with a hole formed in the material. When the laces are inserted through the hole a first time, wrapped around a portion of the material, inserted through the hole a second time, and then pulled tightly in opposite directions, the material deforms to (1) assume a "self-herniated" shape in which the material grips the laces and folds upon itself and the laces toward the hole, and (2) retain the self-herniated shape and secure the laces in place after pulling forces are removed from the laces.

In various embodiments, as material of the device folds upon itself toward the hole to assume the self-herniated shape, the material deforms to enlarge the hole and allow a portion of the material to pass into the hole at least temporarily and the material returns substantially to its initial disk-like shape when released from the laces.

In some embodiments, the piece of material has width of approximately 15-50 millimeters, a thickness of approximately 2-6 millimeters, and a hole with a width of approximately equal to or less than a cross-sectional width of the laces the device is intended to secure.

In other embodiments, the material has water-absorptive properties that cause the device to swell in water and grip the laces more tightly and the material is primarily comprised of neoprene.

DETAILED DESCRIPTION

The following detailed description is merely exemplary in nature and does not limit the disclosure or the application and uses of the invention. As used here, the word "exemplary" means "serving as an example, instance, or illustration." Thus, any embodiment described here as "exemplary" is not necessarily to be construed as preferred or advantageous over other embodiments. Furthermore, there is no intention to be bound by any expressed or implied theory presented in the preceding technical field, background, brief summary, or the following detailed description.

The following description is presented to enable any person skilled in the art to make and use the invention, and is provided in the context of a particular application and its requirements. Various modifications to the disclosed embodiments will be readily apparent to those skilled in the art upon reading this disclosure, and the general principles defined herein may be applied to other embodiments and applications without departing from the spirit and scope of the invention. Thus, the invention is not intended to be limited to the embodiments shown, but it is to be accorded the widest scope consistent with the principles and features disclosed herein.

Figure 1:
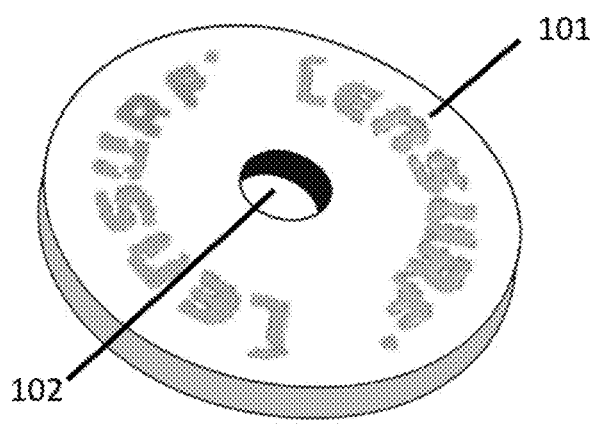
FIG. 1 shows one embodiment of a simple but highly effective device for securing a pair of laces, the particular structure and function of which are described in detail below.

FIG. 1 shows a lace-securing device 101. As described in more detail below, the lace-securing device 101, though having a seemingly simple structure at first glance, is specially designed to engage with and tightly secure a pair of laces as they intertwine with the device 101 in a very forceful manner at the hands of a human user. In particular, through a technique like the one described specifically below, the device's structure causes it to twist and collapse upon itself and around the laces as the laces pass through a perforation or hole 102 at or near the center of the device 101, loop back around the device, pass through it again, and then part forcefully in opposite directions. When subjected to a lace-securing process of this nature, the structure of the device 101 causes the device 101 to "self-herniate" as a portion of the device 101 is pulled with the laces through the hole 102 in the device 101 (at least temporarily, causing the hole to expand in size) as pulling forces are applied by the user. The size and shape of the hole 102 in the device 101 can vary greatly depending upon the specific application for which the device 101 is intended, but in most situations for optimal effectiveness the hole should be roughly circular or ovular in shape and have a width (or diameter if circular) that is roughly equal to or less than the largest cross-sectional width of the laces it is intended to secure.

The structure of the lace-securing device 101 is comprised not only of its shape, but also the physical properties of the material(s) from which it is made. When the device 101 is subjected to a lace-manipulation technique like the one described here, the device experiences substantial shear and rotational forces and must withstand the fatigue caused by the constant "self-herniated" shape it takes when actively engaged in securing the laces tightly. While no mechanical device will last forever, the lace-securing device 101 has material properties that allow it to withstand many repeated cycles of securing and unsecuring laces while still maintaining integrity to perform its intended purpose. When replacement eventually becomes necessary, manufacturing (and thus replacement) cost of the device is extremely low (pennies per unit), making it easy and cost-effective for the user to purchase replacements.

To achieve its purpose, the lace-securing device 101 has physical properties that make it highly flexible, easily twisted and bent upon itself and around the laces 100, and at the same time highly resistant to shearing and twisting forces, making the device 101 resistant to tearing, shredding, or otherwise disintegrating after only a few uses. The device 101 also has a high elastic modulus, allowing the material to withstand severe elastic deformation for long periods of time while securing the laces 100 in the self-herniated position and still revert to its original form when disengaged from the laces.

Neoprene foam is a material having all of these characteristics and therefore is particularly suited for use in constructing the lace-securing device 101. Neoprene gives an added benefit in that it absorbs water and swells when wet, causing the device 101 to grip even more firmly on the laces, pinching them more tightly and thus holding them that much more securely in place, when used in water sports. Other materials that have properties very similar to those of neoprene, and in particular the desired properties mentioned above, are suitable for use as well.

While the device 101 can be made to any size and with any dimensions, as dictated by the purpose and application for which it is used, a device having width/diameter in the range of 15-40 millimeters and thickness in the range of 2-6 millimeters is particularly well-suited for traditional articles of clothing (e.g., shoes and board shorts) with standard-sized laces. A hole size in the range of 2-6 millimeters is also well suited for standard clothing items.

While the lace-securing device 101 described here seems at a glance to have very similar structure to the device of U.S. Pat. No. 9,347,522, an attentive reading of the '522 patent shows that only the shapes (and not the overall structure) of the devices are similar. Because the device of the '522 patent is designed for rigidity (inflexibility) and relies on compressive forces to hold laces in place, it requires and thus is constructed from materials, such as hard plastics or dense polyurethane foam, with properties that are not at all suited for use with the lace-securing device of FIG. 1.

Figure 2:
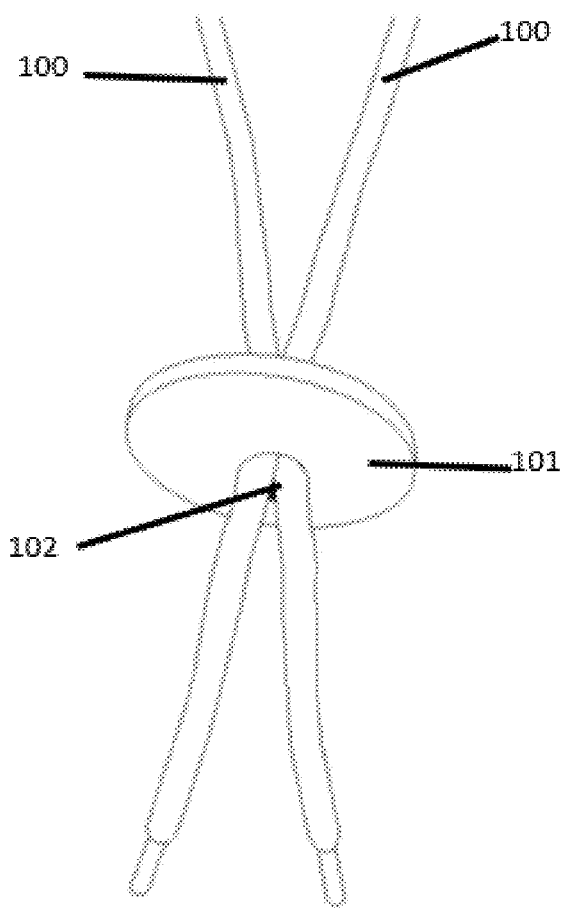
FIG. 2 illustrates the device during a first step of an applied technique for securing a pair of laces with the device.
Figure 3:
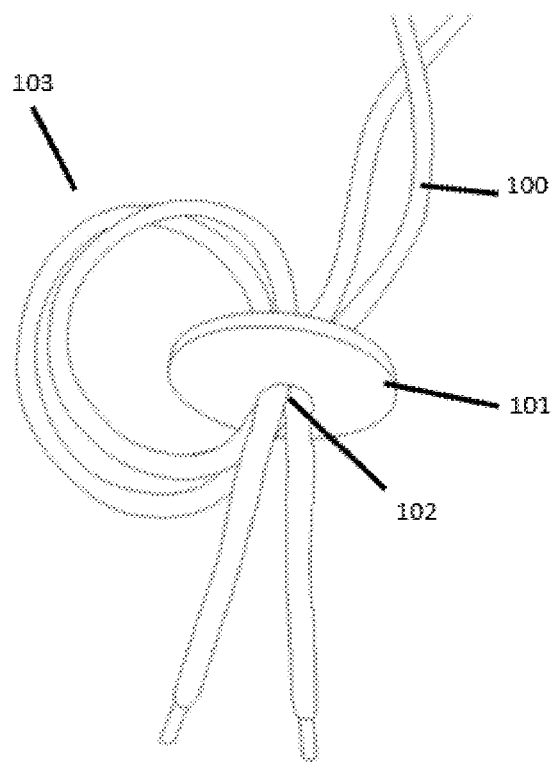
FIG. 3 illustrates the device during a second step of the applied technique for securing a pair of laces with the device.
Figure 4:
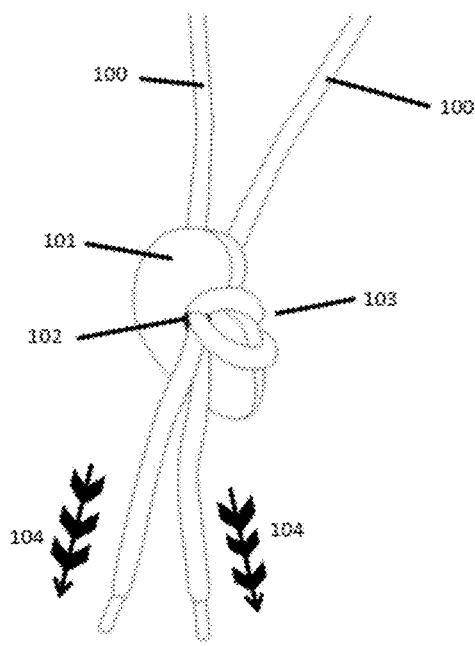
FIG. 4 illustrates the device during a third step of the applied technique for securing a pair of laces with the device.

FIGS. 2 through 5 show the changes the lace-securing device 101 undergoes in physical shape as it engages the pair of laces 100 through a particular lace-securing technique. In FIG. 2, the laces 100 have been inserted by the user through the hole 102 in the device 101. FIG. 3 shows the laces 100 forming a loop 103 around the device 102 by wrapping around a portion of the device 101 and then passing through the hole 102 a second time. In FIG. 4, the loop 103 is tightened as the user applies a pulling force 104 to the free ends of the laces 100, pulling the ends of the laces 100 away from the item (e.g., an article of clothing) to which they are anchored. This tightening of the loop 103 causes the laces 100 to pinch the portion of device 101 surrounded by the loop and distort its shape where the loop 103 surrounds it, firmly grabbing and entrapping that portion of the device 101.

Figure 5:
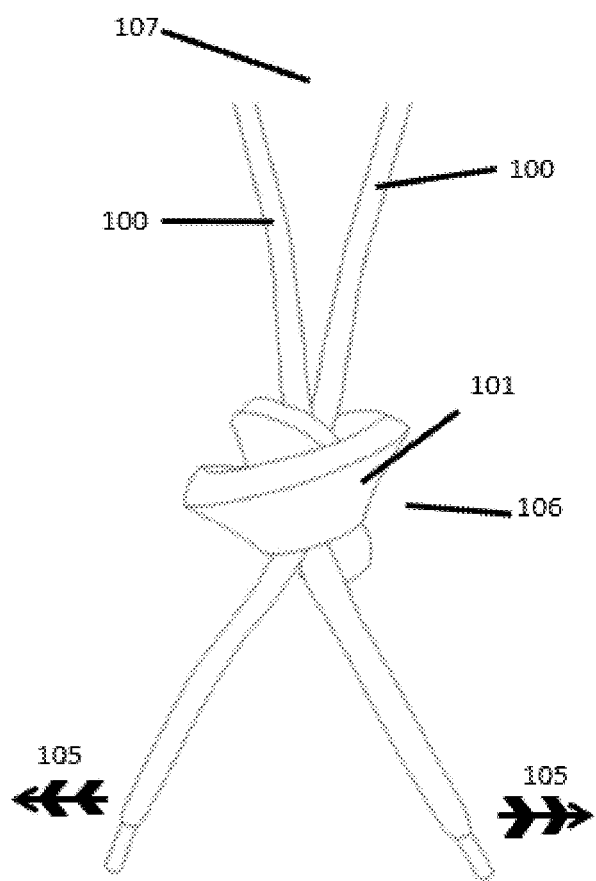
FIG. 5 illustrates the device during a fourth step of the applied technique for securing a pair of laces with the device.

FIG. 5 shows final tightening/securing of the laces 100 as the user applies opposing forces 105 to the laces 100, pulling the free ends of the laces 100 in opposite directions and roughly parallel to the original plane of the device 101. This pulling motion forces the edges of the device 101 inward towards the hole 102 in the device 101. As the laces are pulled and the device 101 collapses on itself and towards the hole 102, the device 101 is forced to slide along the laces towards their "anchoring" or "origin" position 107, that is, towards the item (e.g., the article of clothing) that anchors them. As the device 101 butts up against the origin position 107, portions of the device 101 make a final push into the hole 102 (the device's "self-herniation"), at least temporarily, firmly securing the device in its final state 106, with the laces 100 secured firmly in place. This method helps prevent unexpected untightening of laces. The laces 100 and device 101 remain in this position until the user chooses at a later time to loosen or release the laces by pulling the device 101 along the laces, away from the origin position 107, until it is free from the laces or the laces are sufficiently loose to free the anchoring item from its secured position. Thus, the user does not have to repeat all of the steps to loosen the laces. As is clear from FIG. 5, the device 101 and the laces 100 together form a type of "knot" that is unlike and replaces the traditional hand-tied knot, holding the laces much more securely and reliably in place.

The structural properties of the lace-securing device 101—its shape in combination with its material properties—enable the lace-tying technique described here and the "self-herniation" of the device that makes its grip on the laces especially secure. When fully engaged with the device 101, the laces 100 are secured so firmly that neither the device nor the laces are prone to significant movement or loosening, even during the most turbulent, aggressive, traumatic physical activity—such as tumbling within and being thrown about a crashing ocean wave. The only technique for easily changing the position of the device 101 once it assumes its final state 106 is by applying manual force to the device 101 to slide it along the laces 100 away from or toward the origin position 107. This is easily done intentionally with the human hand but is difficult to do accidentally with the types of motion and traumatic forces typically present in athletics and other extreme activities.

One of the preferred uses of the device is in sports or outdoor activities. In the sport of surfing, for example, the "board shorts" worn by many surfers tend to be secured to the surfer's body by laces, which are notorious for coming untied repeatedly during a single surfing session. The lace-securing device 101 here has proven to be a much more reliable mechanism for holding board-short laces securely in place throughout an entire surfing session.

The embodiments of the invention described above are exemplary in nature. A wide variety of other embodiments are within the scope of the following claims.

What is claimed is:

1. A device for use in securing two or more laces on an article of clothing, the device comprising:
    a piece of flexible and elastic material having shear-resistive properties and an initial disk-like shape; and
    a hole formed in the material;
    where, when the laces are inserted together through the hole a first time, wrapped together around a portion of the piece of material, inserted together through the hole a second time, and pulled tightly in opposite directions, the material deforms to:
        assume a self-herniated shape in which the material grips the laces and folds upon itself and the laces toward the hole; and
        retain the self-herniated shape and secure the laces in place after pulling forces are removed from the laces; and
    where the material has water-absorptive properties that cause the device to swell in water and grip the laces even more tightly.

2. The device of claim 1, where, as the material folds upon itself toward the hole to assume the self-herniated shape, the material deforms to enlarge the hole and allow a portion of the material to pass into the hole at least temporarily.

3. The device of claim 1, where the material returns substantially to its initial disk-like shape when released from the laces.

4. The device of claim 1, where the piece of material has width of approximately 15-40 millimeters.

5. The device of claim 1, where the piece of material has thickness of approximately 2-6 millimeters.

6. A device for use in securing two or more laces on an article of clothing, the device comprising:
    a piece of flexible and elastic material having shear-resistive properties and an initial disk-like shape; and
    a hole formed in the material;
    where, when the laces are inserted together through the hole a first time, wrapped together around a portion of the piece of material, inserted together through the hole a second time, and pulled tightly in opposite directions, the material deforms to:
        assume a self-herniated shape in which the material grips the laces and folds upon itself and the laces toward the hole; and
        retain the self-herniated shape and secure the laces in place after pulling forces are removed from the laces; and
    where the material is comprised primarily of neoprene.

7. The device of claim 6, where, as the material folds upon itself toward the hole to assume the self-herniated shape, the material deforms to enlarge the hole and allow a portion of the material to pass into the hole at least temporarily.

8. The device of claim 6, where the material returns substantially to its initial disk-like shape when released from the laces.

9. The device of claim 6, where the piece of material has width of approximately 15-40 millimeters.

10. The device of claim 6, where the piece of material has thickness of approximately 2-6 millimeters.

\* \* \* \* \*